(12) United States Patent
Lin et al.

(10) Patent No.: US 10,262,552 B2
(45) Date of Patent: Apr. 16, 2019

(54) BALL MOVEMENT STATE MEASURING SYSTEM AND METHOD THEREOF

(71) Applicant: Jingletek Co., Ltd., Tainan (TW)

(72) Inventors: Ching-Lun Lin, Tainan (TW); Yu-Lin Wang, Tainan (TW); Yin-Lin Chen, Tainan (TW); Hsin-Hsi Li, Tainan (TW); Hong-Lin Chen, Tainan (TW); Pei-Yin Tsai, Tainan (TW); I-Tai Wu, Tainan (TW); Hsuan-Bin Huang, Tainan (TW)

(*) Notice: Subject to any disclaimer, the term of this patent is extended or adjusted under 35 U.S.C. 154(b) by 0 days.

(21) Appl. No.: 15/240,441

(22) Filed: Aug. 18, 2016

(65) Prior Publication Data

US 2018/0018901 A1   Jan. 18, 2018

(30) Foreign Application Priority Data

Jul. 18, 2016 (TW) .............................. 105122604 A

(51) Int. Cl.
*G01P 15/00* (2006.01)
*G01C 9/00* (2006.01)
(Continued)

(52) U.S. Cl.
CPC .......... *G09B 19/0038* (2013.01); *A63B 37/00* (2013.01); *A63B 69/0002* (2013.01); *G01P 3/00* (2013.01); *G01P 15/00* (2013.01)

(58) Field of Classification Search
CPC .. G09B 19/0038; A63B 37/00; A63B 69/0002
(Continued)

(56) References Cited

U.S. PATENT DOCUMENTS 5,779,576 A * 7/1998 Smith, III ............... A63B 65/00
                                                      473/570
6,073,086 A * 6/2000 Marinelli ................ A63B 43/00
                                                      473/198
(Continued)

FOREIGN PATENT DOCUMENTS

CN    205055346 U    3/2016
TW    M385698 U1    8/2010
(Continued)

OTHER PUBLICATIONS

English translation of TW M507287, Aug. 2015.*
(Continued)

*Primary Examiner* — Michael P Nghiem

(57) ABSTRACT

In a ball movement state measuring system with a ball, a sensing module, a wireless communication module, a power supply and an induction coil, the speed, rotation speed, rotation axis and trace of the ball at first movement state are calculated based on first accelerated speed and first angular velocity of the ball at first movement state and first movement result is obtained by the processor. The speed, rotation speed, rotation axis and trace of the ball at second movement state are calculated based on speed and rotation axis of the ball at first movement state, second accelerated speed and environment parameter of the ball at second movement state and second movement result is obtained by the processor. The ball is forced by gravity, applied force and air resistance at first movement state, and the ball is forced by gravity, air resistance and centripetal force at second movement state.

17 Claims, 11 Drawing Sheets

(51) Int. Cl.
*G09B 19/00* (2006.01)
*A63B 37/00* (2006.01)
*A63B 69/00* (2006.01)
*G01P 3/00* (2006.01)

(58) Field of Classification Search
USPC .................................................. 702/141, 151
See application file for complete search history.

(56) References Cited

U.S. PATENT DOCUMENTS

| | | | | |
|---|---|---|---|---|
| 2007/0178967 | A1* | 8/2007 | Rosenberg | A63B 24/0087 463/39 |
| 2014/0200692 | A1* | 7/2014 | Thurman | G09B 19/0038 700/91 |
| 2015/0182810 | A1* | 7/2015 | Thurman | A63B 43/004 473/570 |
| 2016/0151693 | A1* | 6/2016 | Keith | A63B 69/00 473/424 |

FOREIGN PATENT DOCUMENTS

| | | |
|---|---|---|
| TW | M455193 U1 | 6/2013 |
| TW | M507287 U | 8/2015 |

OTHER PUBLICATIONS

English translation of TW M385698, Aug. 2010.*
Office Action of corresponding TW application, published on Jan. 11, 2017.
Mohammad Ahmad. "Bend It like Magnus: Simulating Soccer Physics", May 14, 2011.
Nathan. "The effect of spin on the flight of a baseball", American Journal of Physics, vol. 76, Issue 2, pp. 119-124, Feb. 2008.
Kovalevsky et al. "Fundamentals of Astrometry", Cambridge University Press, pp. 48 and 49, Jul. 19, 2004.
Kovalevsky. "Modern Astrometry", Springer Science & Business Media, p. 66, 2013.
Resnick et al. "Physics, vol. 1", Wiley & Sons, Incorporated, John, pp. 27, 47, 74, 161, 163, 177 and 378, Apr. 5, 2001.
Kuipers. "Quatemions and Rotation Sequences: A Primer with Applications to Orbits, Aerospace and Virtual Reality", Princeton University Press, pp. 88 and 89, Sep. 8 2002.

* cited by examiner

BALL MOVEMENT STATE MEASURING SYSTEM AND METHOD THEREOF

CROSS-REFERENCE TO RELATED APPLICATION

This application claims priority from Taiwan Patent Application No. 105122604, filed on Jul. 18, 2016, in the Taiwan Intellectual Property Office, the content of which are hereby incorporated by reference in their entirety for all purposes.

BACKGROUND OF THE INVENTION

1. Field of the Invention

The present invention relates to a measuring system and a method thereof, in particular with respect to a ball movement state measuring system and a method thereof.

2. Description of the Related Art

Ball sport is the most modern public favorite sport, for example, baseball sport is one of the favorite sports people love around the world. If pitcher wants to know pitching speed when pitching a ball, a speed gun is often used for measuring the pitching speed. However, the speed gun is expensive, and therefore a burden exists for the amateur pitcher.

In addition to the pitching speed, if ball flight trajectory or relative information can be known by the pitcher during the pitching practice, the pitcher can improve pitching technique based on the abovementioned ball flight trajectory or relative information. Therefore, under the urgent market demands, how to develop a set of sensing and analyzing techniques for measuring the speed, flight trajectory and rotation direction of the ball has become the anxious challenge and issue to be overcome in the related field.

SUMMARY OF THE INVENTION

In view of the aforementioned technical problems of the prior art, one purpose of the present invention is to provide a ball movement state measuring system and a method thereof so as to solve the problem of hardly measuring the speed, rotation and movement state of the ball in prior art.

In order to accomplish the preceding purpose, the present invention provides a ball movement state measuring system, comprising: a ball having an accommodation element and a cover covering the accommodation element; a sensing module comprising an acceleration sensor and an angular velocity sensor, the acceleration sensor being used for detecting an acceleration of the ball, the angular velocity sensor being used for detecting an angular velocity of the ball; a wireless communication module electrically connected to the sensing module and wirelessly transmitting the acceleration and the angular velocity of the ball to an electronic device, wherein the electronic device has a processor and acquires an environment parameter the ball located; a power supply electrically connected to the sensing module and the wireless communication module, and the sensing module, the wireless communication module and the power supply are disposed inside the accommodation element; and an induction coil disposed between the cover and the accommodation element and electrically connected to the power supply. Wherein the electronic device wirelessly receives the acceleration and the angular velocity of the ball, and a speed, a rotation speed, a rotation axis and a trace of the ball at a first movement state are calculated based on a first acceleration of the acceleration and a first angular velocity of the angular velocity of the ball at the first movement state and a first movement result is obtained by the processor. Wherein a speed, a rotation speed, a rotation axis and a trace of the ball at a second movement state are calculated based on the speed and the rotation axis of the ball at the first movement state, a second acceleration of the acceleration and the environment parameter of the ball at the second movement state and a second movement result is obtained by the processor. Wherein the ball is forced by gravity, applied force and air resistance at the first movement state, and the ball is forced by gravity, air resistance and centripetal force at the second movement state.

The ball movement state measuring system of the present invention further comprises a cushion structure covering an outside of the accommodation element. Wherein the cushion structure is conformally covering the outside of the accommodation element.

The ball movement state measuring system of the present invention further comprises a relay electrically connected to the induction coil and the power supply to be an automatic charging switch of the power supply.

The ball movement state measuring system of the present invention further comprises a wireless charging base, and the ball is put on a concave surface of the wireless charging base such that the induction coil is distant from a wireless charging plate of the wireless charging base by a predetermined charging distance to produce power to charge the power supply. Wherein the predetermined charging distance is less than 10 mm, preferably less than 6 mm. The speed, the rotation speed, the rotation axis and the trace of the ball at the second movement state are calculated only based on the speed and the rotation axis of the ball at the first movement state, the second acceleration of the acceleration and the environment parameter of the ball at the second movement state without basing on a second angular velocity of the angular velocity of the ball at the second movement state. Wherein an overall centroid of the ball movement state measuring system is adjusted to comply with a geometric center of the ball. Wherein the overall centroid of the ball movement state measuring system is adjusted to comply with the geometric center of the ball by adjusting positions of the sensing module, the wireless communication module, the power supply and the induction coil or additionally disposing a weight member inside the accommodation element.

Wherein the environment parameter comprises one or more of a temperature value, an elevation value, a wind force, a wind direction and a humidity value.

Wherein the sensing module further comprises a temperature sensor, and the temperature value of the environment parameter is detected by the temperature sensor. Wherein the environment parameter is provided by a program installed on the electronic device or a database stored in the electronic device.

Further, the present invention also provides a method of measuring ball movement state, comprising: providing a ball movement state measuring system comprising a ball having an accommodation element and a cover, a sensing module, a wireless communication module, a power supply and an induction coil, wherein the sensing module comprises an acceleration sensor and an angular velocity sensor; performing a first movement step to force the ball in a first movement state by gravity, applied force and air resistance; performing a first sensing step to detect a first acceleration and a first angular velocity of the ball at the first movement state by the acceleration sensor and the angular velocity sensor of the sensing module; performing a second movement step to force the ball in a second movement state by gravity, air resistance and centripetal force; performing a second sensing step to detect a second acceleration and a second angular velocity of the ball at the second movement state by the acceleration sensor and the angular velocity sensor of the sensing module; performing a wireless transmitting step to wirelessly transmit the first acceleration and the first angular velocity of the ball at the first movement state and the second acceleration of the ball at the second movement state respectively to an electronic device by the wireless communication module, wherein the electronic device acquires an environment parameter the ball located; performing a data processing step to calculate a speed, a rotation speed, a rotation axis and a trace of the ball at the first movement state based on the first acceleration and the first angular velocity of the ball at the first movement state to obtain a first movement result, and to calculate a speed, a rotation speed, a rotation axis and a trace of the ball at the second movement state based on the speed and the rotation axis of the ball at the first movement state, the second acceleration and the environment parameter of the ball at the second movement state to obtain a second movement result by a processor of the electronic device; and performing a display step to display the first movement result and the second movement result by the electronic device.

The method of measuring ball movement state of the present invention further comprises performing a third movement step to force the ball in a third movement state by gravity, applied force and air resistance and performing a third sensing step to detect a third acceleration and a third angular velocity of the ball at the third movement state by the acceleration sensor and the angular velocity sensor of the sensing module.

Wherein the environment parameter comprises one or more of a temperature value, an elevation value, a wind force, a wind direction and a humidity value.

Wherein the sensing module further comprises a temperature sensor, and the temperature value of the environment parameter is detected by the temperature sensor. Wherein the environment parameter is provided by a program installed on the electronic device or a database stored in the electronic device. Wherein the first movement result and the second movement result are displayed by a display screen, a loudspeaker or a vibrator of the electronic device. Wherein the speed, the rotation speed, the rotation axis and the trace of the ball at the second movement state are calculated only based on the speed and the rotation axis of the ball at the first movement state, the second acceleration of the acceleration and the environment parameter of the ball at the second movement state without basing on a second angular velocity of the angular velocity of the ball at the second movement state.

In accordance with the preceding description, the ball movement state measuring system and a method thereof of the present invention may have one or more following advantages:

(1) In the ball movement state measuring system and the method thereof of the present invention, the acceleration and the angular velocity of the ball can be detected by the acceleration sensor and the angular velocity sensor of the sensing module and transmitted to the processor of the electronic device, and the speed, rotation speed, rotation axis and trace of the ball can be calculated by the processor.

(2) In the ball movement state measuring system and the method thereof of the present invention, the speed, rotation speed, rotation axis and trace of the ball at the first movement state can be calculated based on the first acceleration and the first angular velocity of the angular velocity of the ball at the first movement state by the processor, and the first movement result of the ball can also be obtained.

(3) In the ball movement state measuring system and the method thereof of the present invention, the speed, rotation speed, rotation axis and trace of the ball at the second movement state can be calculated based on the speed and the rotation axis of the ball at the first movement state, the second acceleration of the acceleration and the environment parameter of the ball at the second movement state by the processor, and the second movement result of the ball can also be obtained.

(4) In the ball movement state measuring system of the present invention, the ball is put on the concave surface of the wireless charging base to charge the power supply by electromagnetic induction occurred by the wireless charging plate of the wireless charging base and the induction coil of the ball.

(5) In the ball movement state measuring system of the present invention, the relay electrically connected to the induction coil and the power supply can act as the automatic charging switch of the power supply.

(6) In the ball movement state measuring system of the present invention, the structural error can be eliminated and the cushioning effect can be provided for the sensing module, the wireless communication module and the power supply disposed inside the accommodation element by the cushion structure covering the outside of the accommodation element such that the damage of the sensing module, the wireless communication module and the power supply during the ball movement process can be prevented.

DETAILED DESCRIPTION OF THE PREFERRED EMBODIMENTS

Figure 1:
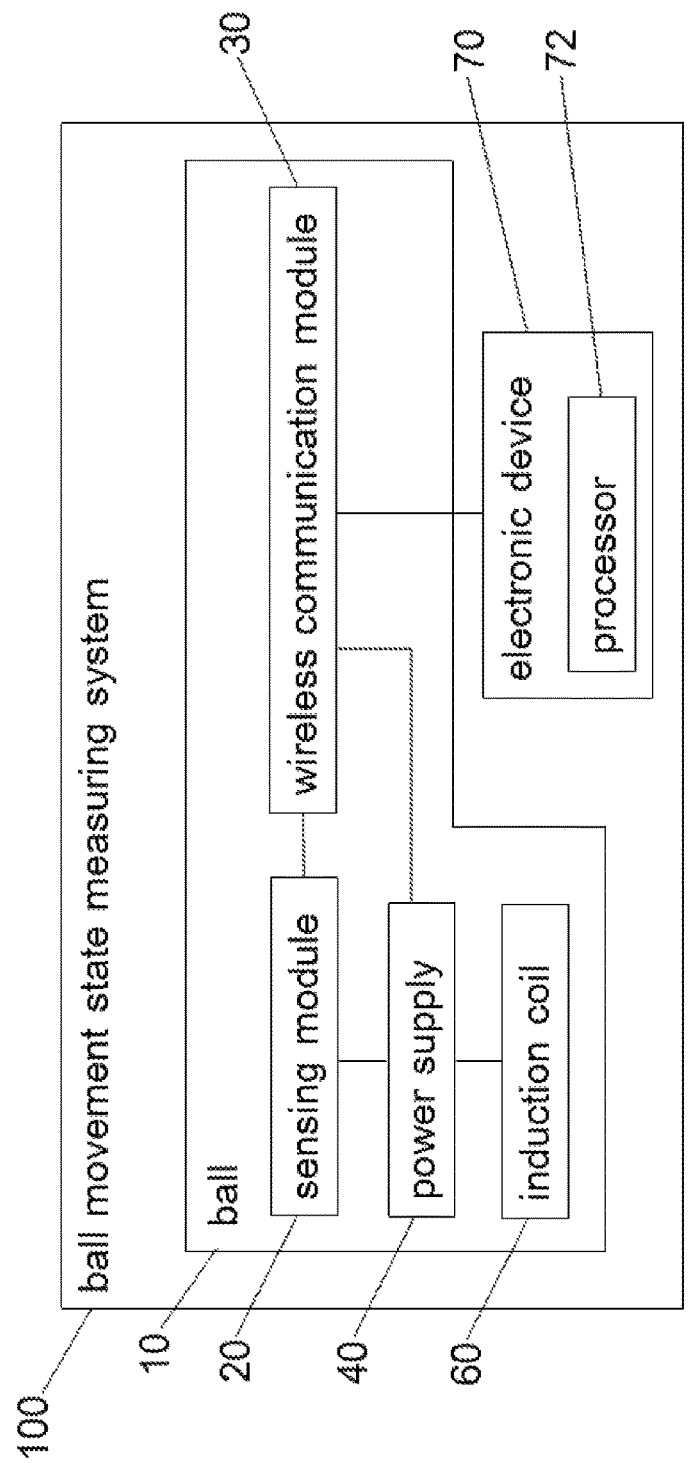
FIG. 1 is a circuit block diagram of the first embodiment of the ball movement state measuring system of the present invention.

For purposes of understanding the technical features, contents, advantages and technical effects achieved thereby, various embodiments of the present invention will now be described in more detail with reference to the accompanying drawings. Drawings are used for illustrating and assisting in understanding the detailed description, not represent the real scale and precise configuration of the present invention. Therefore, the claims cope of the subject matter are not interpreted or limited by the scale and configuration of the accompanying drawings. Further, for purposes of explanation, in the drawings, similar symbols typically identify similar components, unless context dictates otherwise.

Figure 3:
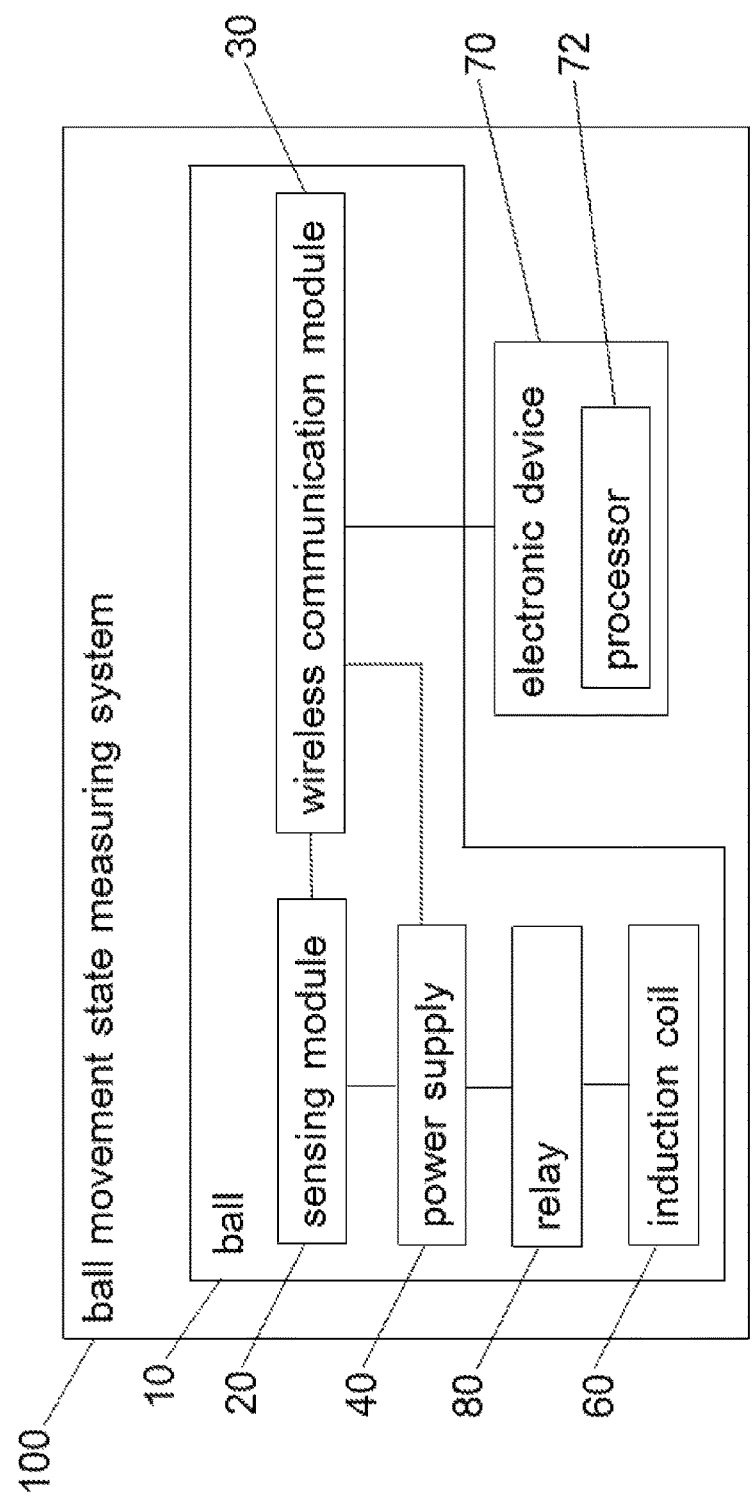
FIG. 3 is a circuit block diagram of the second embodiment of the ball movement state measuring system of the present invention.
Figure 4:
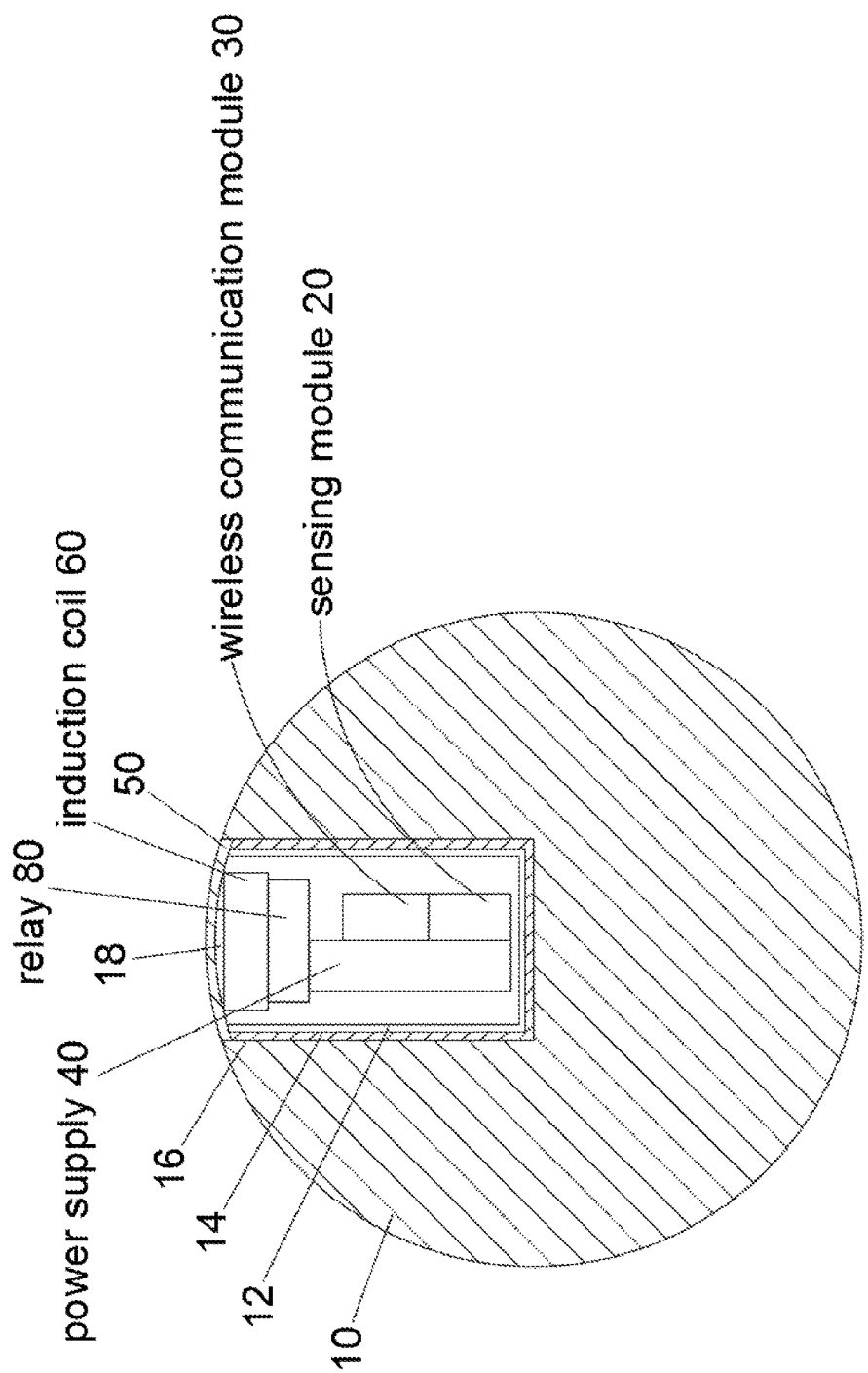
FIG. 4 is a schematic diagram of the first configuration of the ball movement state measuring system of the present invention.
Figure 6:
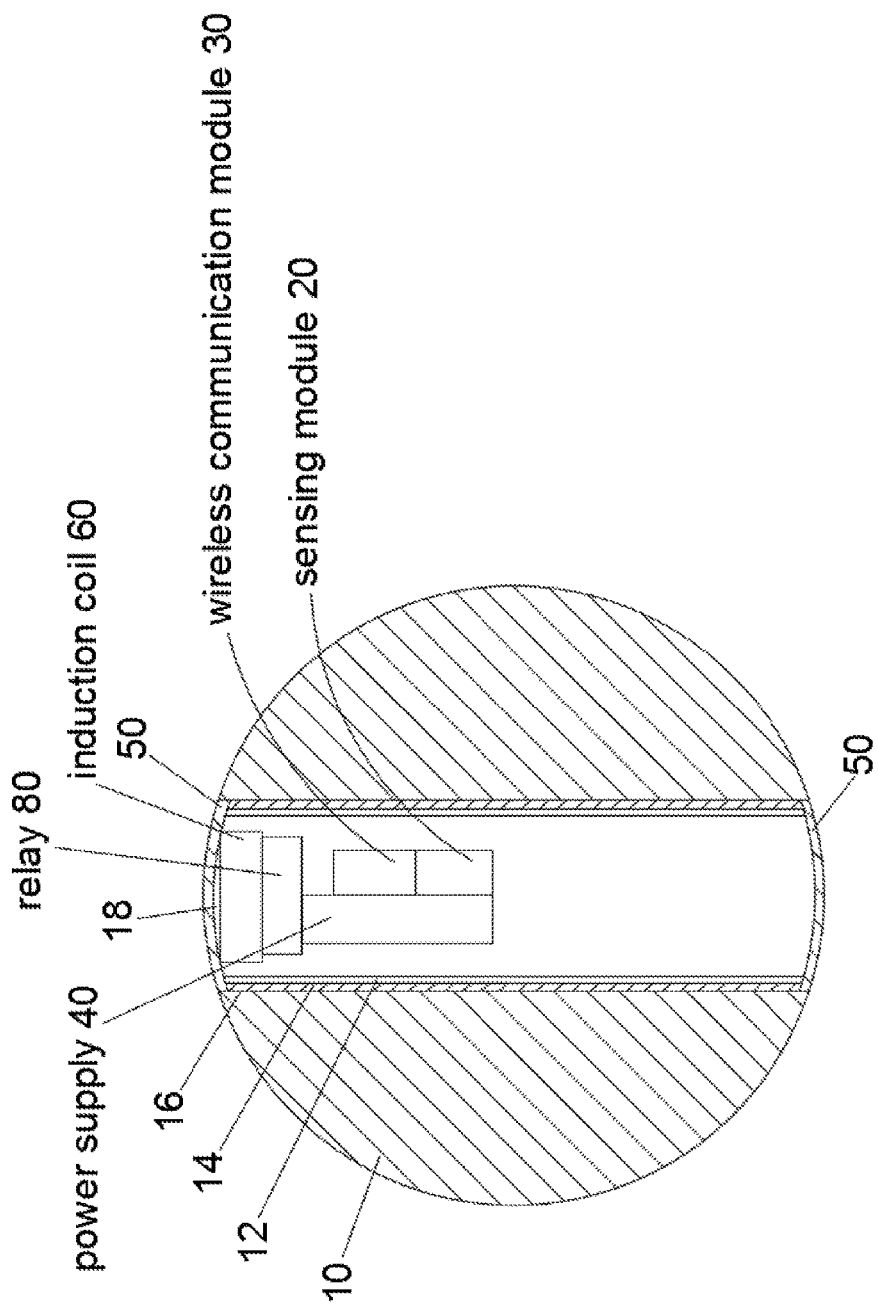
FIG. 6 is a schematic diagram of the second configuration of the ball movement state measuring system of the present invention.

Referring to FIGS. 1, 3 and 4, FIG. 1 is a circuit block diagram of the first embodiment of the ball movement state measuring system of the present invention, FIG. 3 is a circuit block diagram of the second embodiment of the ball movement state measuring system of the present invention, and FIG. 4 is a schematic diagram of the first configuration of the ball movement state measuring system of the present invention. The difference between the second embodiment and the first embodiment of the ball movement state measuring system of the present invention is merely that a relay 80 is further utilized in the second embodiment (to be described in more detail hereinafter). In the first embodiment of the present invention, the ball movement state measuring system 100 at least comprises a ball 10 having an accommodation element 12 and a cover 50, a sensing module 20, a wireless communication module 30, a power supply 40 and an induction coil 60. In detailed speaking, the ball 10 comprises a main body and an outer skin covering the outside of the main body, and the main body has a recess 16. The recess 16 can be a recess part recessing from the surface of the main body into the inner part of the main body (referring to FIG. 4), and also can be a recess part penetrating from one surface of the main body through the opposite surface of the main body (referring to FIG. 6, the two covers 50 cover the two opposite surfaces of the main body respectively). The aforementioned forms of the recess 16 are examples, but not limited thereto. The form and configuration of the recess 16 can be changed or modified for actual demand. The material of the main body can be cork, rubber, cork mixed with rubber, wound multilayer-cotton thread or a combination thereof, but not limited thereto. As shown in FIG. 4, the size of the accommodation element 12 is corresponding to that of the recess 16 and can be, for example, disposed inside the recess 16 of the ball 10. The cover 50 is used for covering the accommodation element 12 disposed inside the recess 16, and the top of the cover 50 is preferably substantially aligned with the surface of the main body. The sensing module 20 at least comprises an acceleration sensor 22 and an angular velocity sensor 24, and the acceleration sensor 22 is used for detecting the acceleration of the ball 10, the angular velocity sensor 24 is used for detecting the angular velocity of the ball 10. The wireless communication module 30 is electrically connected to the sensing module 20 and wirelessly transmitting the acceleration and the angular velocity of the ball 10 to an electronic device 70, wherein the electronic device 70 has a processor 72 and preferably acquires the environment parameter the ball 10 located. The environment parameter can, for example, comprise one or more of a temperature value, an elevation value, a wind force, a wind direction and a humidity value. The environment parameter the ball 10 located acquired by the electronic device 70 can be, for example, provided by the Bureau of Meteorology via a program installed on the electronic device 70 or by a database stored in the electronic device 70. The power supply 40 is electrically connected to the sensing module 20 and the wireless communication module 30, and the sensing module 20, the wireless communication module 30 and the power supply 40 are disposed inside the accommodation element 12. The induction coil 60 can be, for example, in the flat encircled form, and disposed on the inner side of the cover 50. Wherein the induction coil 60 is disposed between the cover 50 and the accommodation element 12 and electrically connected to the power supply 40. The two wire contacts of the induction coil 60 are preferably designed to extend from the annular center of the induction coil 60 to electrically connect to the power supply 40 such that it is more convenient to dispose the overall configuration. In this embodiment configuration, the recess 16 and accommodation element 12 are both provided. However, in another embodiment configuration of the present invention, the recess 16 is the accommodation element 12, that is the accommodation element 12 is omitted, and the recess 16 is covered directly by the cover 50, and the aforementioned electronic elements are disposed inside the recess 16. Additionally, in the other embodiment configuration of the present invention, the cover 50 can be omitted and the recess 16 is the accommodation element 12, that is the recess 16 is omitted, and the accommodation element 12 is directly disposed inside the interior of the ball 10. In the present invention, an overall centroid of the all components of the ball movement state measuring system 100 can be adjusted to comply with a geometric center of the ball 10, such as by adjusting positions of each components or additionally disposing a weight member 18 inside the accommodation element 12, to maintain the stability of the ball 10 during moving.

The electronic device 70 wirelessly receives the acceleration and the angular velocity of the ball 10, and the speed, the rotation speed, the rotation axis and the trace of the ball 10 at the first movement state are calculated based on the first acceleration of the acceleration and the first angular velocity of the angular velocity of the ball 10 at the first movement state and the first movement result is obtained by the processor 72. Detailed speaking, the first speed of the ball 10 at the first movement state is calculated based on a first acceleration of the acceleration of the ball 10 at the first movement state, the rotation speed of the ball 10 at the first movement state is calculated based on a first angular velocity of the angular velocity of the ball 10 at the first movement state, the rotation axis of the ball 10 at the first movement state is calculated based on the first angular velocity of the ball 10 at the first movement, and the trace of the ball 10 at the first movement state is calculated based on the first acceleration of the ball 10 at the first movement state. Wherein the first angular velocity of the ball 10 is degrees the ball 10 rotating per second at the first movement state, and the rotation speed of the ball 10 at the first movement state is revolutions the ball 10 rotating per minute at the first movement state such that the rotation speed of the ball 10 at the first movement state is equal to $30/\pi$ times of the first angular velocity of the ball 10. And, the speed, the rotation speed, the rotation axis and the trace of the ball 10 at the second movement state are calculated based on the speed and the rotation axis of the ball 10 at the first movement state, the second acceleration of the acceleration and the environment parameter of the ball 10 at the second movement state and the second movement result is obtained by the processor 72, wherein the foregoing speed and/or rotation axis of the ball 10 at the first movement state are preferably the last speed and/or rotation axis or the tendency of the speed and/or rotation axis of the ball 10 before the ball 10 is thrown out at the first movement state. Detailed speaking, the second speed of the ball 10 at the second movement state is calculated based on a second acceleration of the acceleration of the ball 10 at the second movement state, the rotation speed of the ball 10 at the second movement state is calculated based on the second acceleration of the ball 10 at the second movement state, the rotation axis of the ball 10 at the second movement state is calculated based on the first speed of the ball 10 at the first movement state and the second acceleration of the ball 10 at the second movement state, and the trace of the ball 10 at the second movement state is calculated based on the rotation axis of the ball 10 at the first movement state, the second acceleration of the ball 10 and the environment parameter at the second movement state, wherein the rotation speed of the ball 10 at the second movement state is revolutions the ball 10 rotating per minute at the second movement state. Wherein the ball 10 is forced by gravity, applied force and air resistance at the first movement state, and the ball 10 is forced by gravity, air resistance and centripetal force at the second movement state. The aforementioned applied force is provided by the pitcher.

<First Movement State>

I. The first speed of the ball at the first movement state can be calculated based on the first acceleration of the ball at the first movement state because:

The first speed ($V_I(t)$) is the velocity of the ball at the first movement state. The first speed ($V_I(t)$) can be obtained by integrating the acceleration ($a_I(t)$) detected by the acceleration sensor.

$$a_I(t) = dv_I(t)/dt$$

$$dv_I(t) = a_I(t)dt$$

$$\int dv_I(t) = \int a_I(t)dt$$

$$v_I(t) = \int a_I(t)dt$$

See Robert R., David H., Kenneth S. K. Physics Volume 1. Wiley, 2001. Page 27.

II. The rotation speed of the ball at the first movement state can be calculated based on the first angular velocity of the ball at the first movement state because:

The rotation speed ($N_I$) at the first movement state is the revolutions the ball rotating per minutes (revolutions pre minutes, rpm) at the first movement state. The first angular velocity ($\omega_I$) is the angular velocity of the ball at the first movement state measured by the angular velocity sensor, and is the degrees the ball rotating per second (degree/s). Therefore, the rotation speed ($N_I$) can be obtained based on the first angular velocity ($\omega_I$) detected by the angular velocity sensor.

$$\omega_I = \phi/t, \text{ where } t\text{:second}, \phi\text{:degree displacement} \Rightarrow \phi = \omega_I t$$

$$N_I = 60 \times rev/t$$
$$= 60 \times \frac{\phi/2\pi}{t} = 60 \times \frac{\omega_I t/2\pi}{t}$$
$$= 30 \times \omega_I/\pi = \frac{30\omega_I}{\pi}$$

See Robert R., David H., Kenneth S. K. Physics Volume 1. Wiley, 2001. Page 161.

III. The rotation axis of the ball at the first movement state can be calculated based on the first angular velocity of the ball at the first movement state because:

The rotation axis ($\tau_I$) at the first movement state is the direction of the axis of a rotating ball relative to the ground. The rotating angle ($\theta$) of the ball can be obtained by integrating the angular velocity ($\omega$) detected by the angular velocity sensor. The rotation matrix (R) can be obtained by Euler angle formula. The rotation axis ($\tau_I$) can be obtained by multiplying the rotation matrix (R) and the angular velocity ($\omega_I$).

$$\theta(t) = \int \omega(t) dt$$

$$R_X(\theta) = \begin{bmatrix} 1 & 0 & 0 \\ 0 & \cos\theta & -\sin\theta \\ 0 & \sin\theta & \cos\theta \end{bmatrix}$$

$$R_Y(\theta) = \begin{bmatrix} \cos\theta & 0 & \sin\theta \\ 0 & 1 & 0 \\ -\sin\theta & 0 & \cos\theta \end{bmatrix}$$

$$R_Z(\theta) = \begin{bmatrix} \cos\theta & -\sin\theta & 0 \\ \sin\theta & \cos\theta & 0 \\ 0 & 0 & 1 \end{bmatrix}$$

$$R = R_Z(\alpha)R_X(\beta)R_Z(\gamma) = \begin{bmatrix} c\alpha c\gamma - s\alpha c\beta s\gamma & -c\alpha s\gamma - s\alpha c\beta c\gamma & s\alpha s\beta \\ s\alpha c\gamma + c\alpha c\beta s\gamma & -s\alpha s\gamma + c\alpha c\beta c\gamma & -c\alpha s\beta \\ s\beta s\gamma & s\beta c\gamma & c\beta \end{bmatrix}$$

$$\tau_I = R * \omega_I$$

See Jean Kovalevsky, P. Kenneth, Fundamentals of Astrometry, 2004, page 48-49; J. B. Kuipers, Quaternions and Rotation Sequences: A Primer with Applications to Orbits, Aerospace, and Virtual Reality, 2002, page 88-89; and Jean Kovalevsky, Modern Astrometry, 2013, page 66.

IV. The trace of the ball at the first movement state can be calculated based on the first acceleration of the ball at the first movement state because:

The trace at the first movement state is the moving path of the ball at the first movement state. The trace ($\chi_I$) per unit time can be obtained based on the first acceleration ($a_I$) detected by the acceleration sensor and the first speed ($V_I$) calculated by the first acceleration ($a_I$). And the trace of the ball at the first movement state can be obtained by recording all of the trace ($\chi_I$) per unit time.

$$x_I = v_I t + \frac{1}{2} a_I t^2$$

See Robert R., David H., Kenneth S. K. Physics Volume 1. Wiley, 2001. Page 27.

<Second Movement State>

I. The second speed of the ball at the second movement state can be calculated based on the second acceleration of the ball at the second movement state because:

The second speed ($V_{II}$) is the velocity of the ball at the second movement state. The second speed ($V_{II}$) can be obtained by integrating the acceleration ($a_{II}$) detected by the acceleration sensor.

$$v_{II} = \int a_{II} dt$$

See Robert R., David H., Kenneth S. K. Physics Volume 1. Wiley, 2001. Page 27.

II. The rotation speed of the ball at the second movement state can be calculated based on the second acceleration of the ball at the second movement state because:

The rotation speed ($N_{II}$) at the second movement state is the revolutions the ball rotating per minutes (revolutions pre minutes, rpm) at the second movement state. When a ball rotates one revolution, the magnitude of the acceleration detected by the acceleration sensor will show a simple harmonic oscillation, which means that the acceleration of the ball has a maximum magnitude in forward direction and a maximum magnitude in backward direction. Therefore, by calculating the number of the simple harmonic oscillation based on the second acceleration detected by the acceleration sensor, the rotation speed ($N_{II}$) at the second movement state can be obtained.

Figure 7:
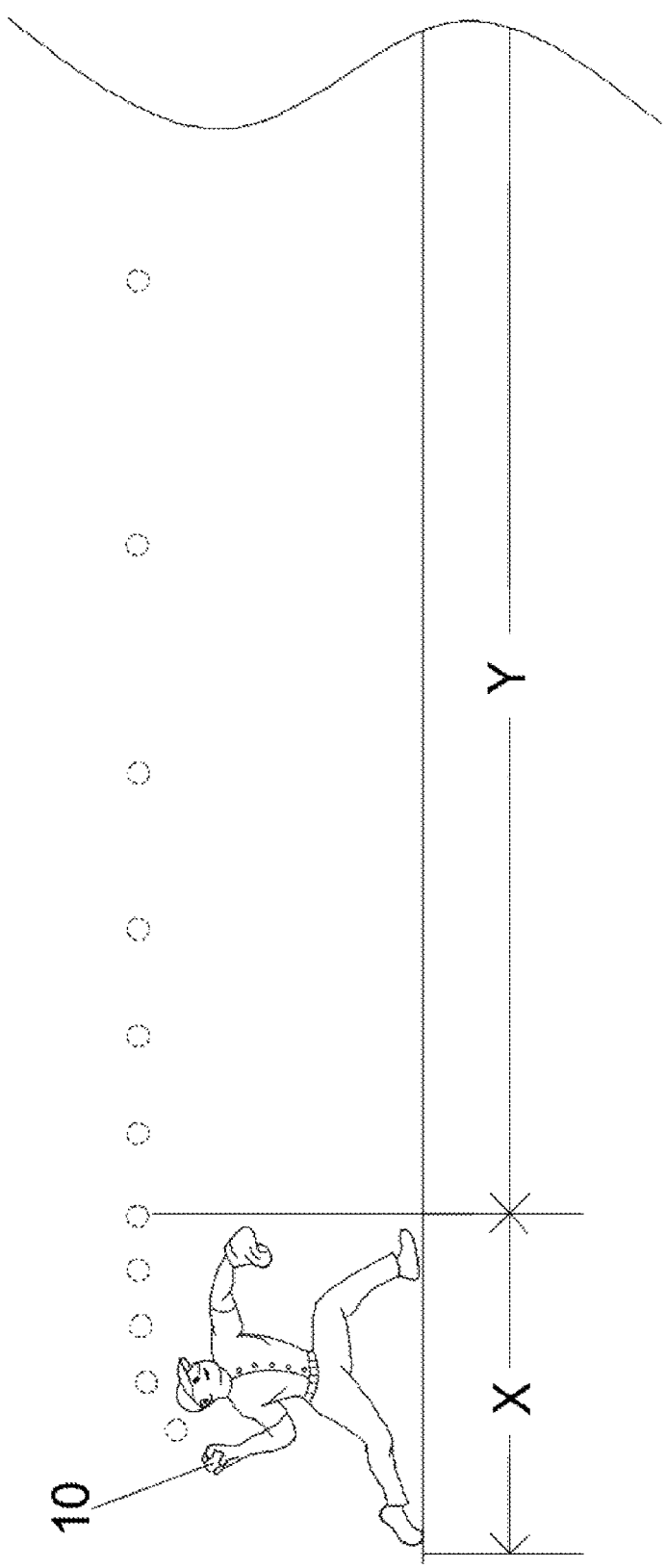
FIG. 7 is a schematic diagram of the ball at the first movement state and the second movement state.

See Robert R., David H., Kenneth S. K. Physics Volume 1. Wiley, 2001. Page 74 FIG. 4-15, Page 378 FIG. 17-7.

III. The rotation axis of the ball at the second movement state can be calculated based on the first speed of the ball at the first movement state and the second acceleration of the ball at the second movement state because:

The rotation axis ($\tau_{II}$) at the second movement state is the direction of the axis of a rotation ball relative to the ground. Please refer to pages 163 and 177 in Robert R., David H., Kenneth S. K. Physics Volume 1. Wiley, 2001, we can obtain the rotation axis ($\tau_{II}$), which is the direction of the torque, by the right-hand rule. After obtaining the first speed ($V_I$) and the second speed ($V_{II}$) by aforementioned manner, the orthogonal vector of the first speed ($V_I$) and the second speed ($V_{II}$) is the rotation axis ($\tau_{II}$) at the second movement state.

$$\tau_{II} = v_I \times v_{II}$$

See Robert R., David H., Kenneth S. K. Physics Volume 1. Wiley, 2001. Pages 163, 177.

IV. The trace of the ball at the second movement state can be calculated based on the rotation axis of the ball at the first movement state and the second acceleration of the ball and the environment parameter at the second movement state because:

The trace at the second movement state is the moving path of the ball at the second movement state. The trace ($\chi_{II}$) per unit time can be obtained based on the second acceleration ($a_{II}$) detected by the acceleration sensor and the second speed ($V_{II}$) calculated by the second acceleration ($a_{II}$). And the trace of the ball at the second movement state can be obtained by recording all of the trace ($\chi_{II}$) per unit time.

However, the spinning ball in flight is forced by the gravity force ($F_G$), the drag force ($F_D$) and the Magnus force ($F_M$), and the total force ($F_f$) is the sum of the gravity force ($F_G$), the draft force ($F_D$) and the Magnus force ($F_M$). Wherein $C_D$ is drag coefficient, $C_M$ is Magnus coefficient, $\rho$ is air density (which is related to the environment parameter), A is cross-section area of the ball, $V_{II}$ is the second speed, and $\tau_I$ is the rotation axis of the ball at the first movement state.

By using the drag force formula, the drag force ($\vec{F}_D$) can be obtained based on the environment parameter at the second movement state and the second speed (related to the second acceleration). And by using the Magnus force formula, the Magnus force ($\vec{F}_M$) can be obtained based on the environment parameter at the second movement state, the second speed (related to the second acceleration) and the rotation axis ($\tau_I$) at the first movement state.

After obtaining the drag force ($\vec{F}_D$) and the Magnus force ($\vec{F}_M$), the total force ($\vec{F}_f$) can be calculated. According to $\vec{F}_{f_t} = m \times \vec{a}_t$ (m is the mass of the ball, and $\vec{a}_t$ is the acceleration of the ball (which is the second acceleration ($a_{II}$))), $\vec{a}_t$ can be finally calculated. And then the trace of the ball at the second movement state can also be calculated according to the displacement formula $$x_{II} = v_{II}t + \frac{1}{2}a_{II}t^2$$

$$\vec{F}_D = \frac{1}{2}C_D \cdot \rho \cdot A \cdot v_{II}^2 \cdot \left(-\frac{v_I}{v_{II}}\right)$$

$$F_M = \frac{1}{2}C_M \cdot \rho \cdot A \cdot v_{II}^2 \cdot \left(\frac{\tau_I \times v_{II}}{\tau_I v_{II}}\right)$$

$$F_f = F_g + F_D + F_M$$

$$\vec{F}_{f_t} = m \cdot \vec{a}_t$$

$$x_{II} = v_{II}t + \frac{1}{2}a_{II}t^2$$

See Robert R., David H., Kenneth S. K. Physics Volume 1. Wiley, 2001. Page 27, Page 47; AHMAD, Mohammad. Bend It like Magnus: Simulating Soccer Physics. 2011; and Alan M. Nathana. The effect of spin on the flight of a baseball. 2008.

In the ball movement state measuring system 100 of the present invention, the acceleration of the ball 10 is detected by the acceleration sensor 22, that is, the variation of the speed of the ball 10 during moving and the momentum information of the ball 10 at different orientations can be detected. The acceleration sensor 22 can be, for example, a three-axis acceleration sensor, and able to measure the acceleration data in three orthogonal directions. The acceleration sensor 22 is not limited to the aforementioned three-axis acceleration sensor, and any sensor capable of measuring the variation of the speed of the ball 10 during moving is adaptable to be the claimed acceleration sensor 22 in the present invention.

In the ball movement state measuring system 100 of the present invention, the angular velocity of the ball 10 is detected by the angular velocity sensor 24, that is, the variation information of the movement orientations of the ball 10 can be detected. The angular velocity sensor 24 can be, for example, a three-axis gyroscope, and able to measure the angular displacement data in three orthogonal directions. The angular velocity sensor 24 is not limited to the aforementioned three-axis gyroscope, and any sensor capable of measuring the variation information of the movement orientations of the ball 10 is adaptable to be the claimed angular velocity sensor 24 in the present invention.

The acceleration and the angular velocity of the ball 10 are wirelessly transmitted to the electronic device 70 by the wireless communication module 30 in the ball movement state measuring system 100 of the present invention. The electronic device 70 can be, for example, a desktop, laptop, mobile phone or other electronic mobile devices. The wireless communication module 30 can be, for example, a Bluetooth transmission module, ANT+, Bluetooth or Bluetooth low energy (BLE) transmission module. The movement information such as acceleration or angular velocity of the ball 10 can be transmitted to the electronic device 70 by the wireless communication module 30 such that the subsequent data processing step can be performed by the processor 72 of the electronic device 70. The wireless communication module 30 is not limited to the aforementioned communication module, and any communication module capable of transmitting the movement information of the ball 10 to the electronic device 70 is adaptable to be the claimed wireless communication module 30 in the present invention.

In the present invention, the ball movement state measuring system 100 further comprises a cushion structure 14 covering the outside of the accommodation element 12. Preferably, the cushion structure 14 can, for example, conformally cover or attach onto the periphery of the accommodation element 12. Therefore, when the accommodation element 12 is inserted into the recess 16 of the ball 10, the structural error between the accommodation element 12 and the recess 16 can be reduced, and the cushioning effect can also be provided. As shown in FIG. 4, the cushioning effect can be provided for the sensing module 20, the wireless communication module 30 and the power supply 40 disposed inside the accommodation element 12 by the cushion structure 14 covering the outside of the accommodation element 12 such that the damage of the sensing module 20, the wireless communication module 30 and the power supply 40 during the ball movement process can be prevented. In another embodiment configuration of the present invention, the cushion structure 14 can, for example, conformally cover or attach onto the peripheries of the accommodation element 12 and the cover 50 simultaneously, and the cushion structure 14 covering the cover 50 is preferably substantially aligned with the surface of the main body.

Figure 5:
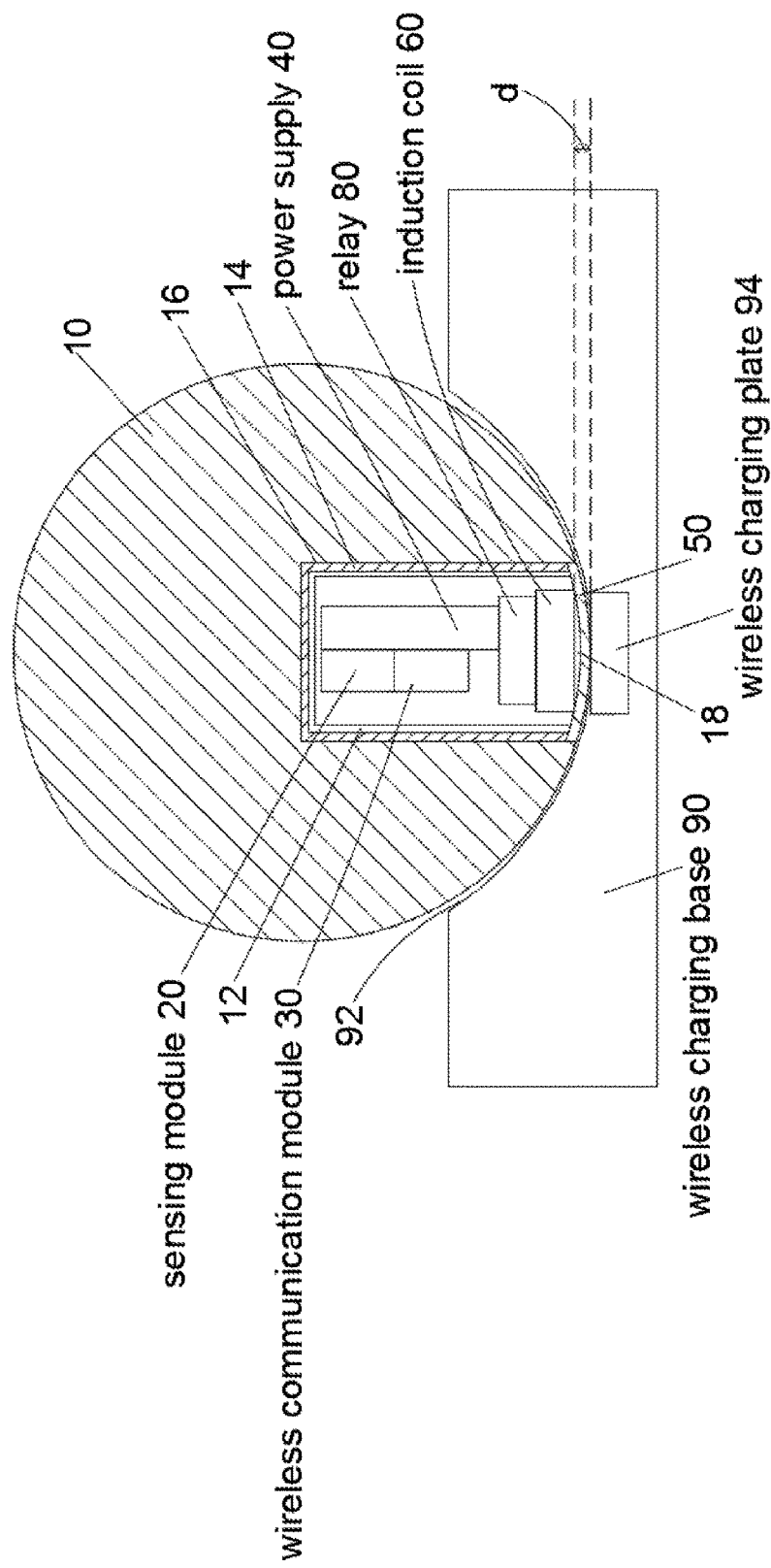
FIG. 5 is a schematic diagram of the ball placed on the wireless charging base.

In the present invention, the ball movement state measuring system 100 further comprises a wireless charging base 90. The top of the wireless charging base 90 is configured with a concave surface 92 and having a wireless charging plate 94. The wireless charging plate 94 is, for example, an induction coil in the flat form. Referring to FIG. 5, FIG. 5 is a schematic diagram of the ball placed on the wireless charging base. As shown in FIG. 5, the ball 10 is put on the concave surface 92 of the wireless charging base 90, and the induction coil 60 is distant from the wireless charging plate 94 a predetermined charging distance d to produce power to charge the power supply 40. Wherein the predetermined charging distance d is, for example, less than 10 mm, preferably less than 6 mm. The electromagnetic induction is produced by the wireless charging plate 94 and the induction coil 60 of the ball 10 to make the induction coil 60 generate the induction current so as to charge the power supply 40. Thereby, the ball 10 can be charged without additionally connecting wires to the ball 10. When user wants to charge the ball 10 or the power of the power supply 40 of the ball 10 is exhausted, it is easy to perform the charging process for reusing the ball 10 by placing the ball 10 on the concave surface 92 of the wireless charging base 90.

In the second embodiment of the ball movement state measuring system of the present invention, the ball movement state measuring system 100 further comprises a relay 80 electrically connected to the induction coil 60 and the power supply 40, and the relay 80 can act as the automatic charging switch of the power supply 40 (referring to FIGS. 3 and 4).

Figure 2:
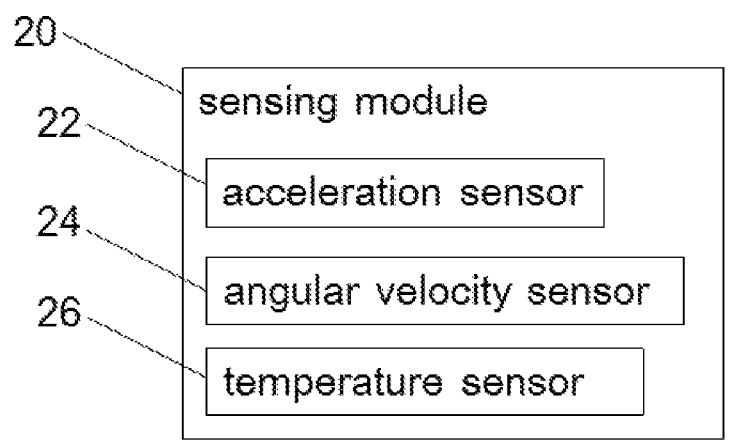
FIG. 2 is a schematic diagram of the sensing module of the present invention.

Additionally, as shown in FIG. 2, the sensing module 20 further comprises a temperature sensor 26, and the temperature value of the aforementioned environment parameter can be, for example, detected by the temperature sensor 26. The temperature value detected by the temperature sensor 26 can be, for example, wirelessly transmitted to the electronic device 70 by the wireless communication module 30 such that the processor 72 of the electronic device 70 can thereby perform the subsequent data processing. The temperature sensor 26 can be, for example, a thermometer, a thermistor or thermocouple sensor capable of measuring temperature and so on. The temperature sensor 26 is not limited to the aforementioned sensor, and any sensor capable of measuring the temperature the ball 10 located is adaptable to be the claimed temperature sensor 26 in the present invention.

As mentioned above, the ball 10 is forced by gravity, applied force and air resistance at the first movement state, and the ball 10 is forced by gravity, air resistance and centripetal force at the second movement state. In the present invention, the first movement state X refers to the state of the period from user or pitcher holding and pitching the ball 10 until throwing the ball 10 out, and thus the ball 10 is forced by gravity, applied force and air resistance at the first movement state X. The second movement state Y refers to the state of the period from the ball 10 thrown out by pitcher until the ball 10 being stationary, and thus the ball 10 is forced by gravity, air resistance and centripetal force at the second movement state Y (referring to FIG. 7). If user moves the ball 10 by forcing the ball 10, but not throwing out the ball 10, such as holding the ball 10 and circling or displacing the ball 10, etc., the state of the ball 10 during this period is defined as the third movement state Z. The ball 10 is forced by gravity, applied force and air resistance in the third movement state Z (referring to FIG. 8). The aforementioned applied force is provided by the pitcher or user.

Figure 9:
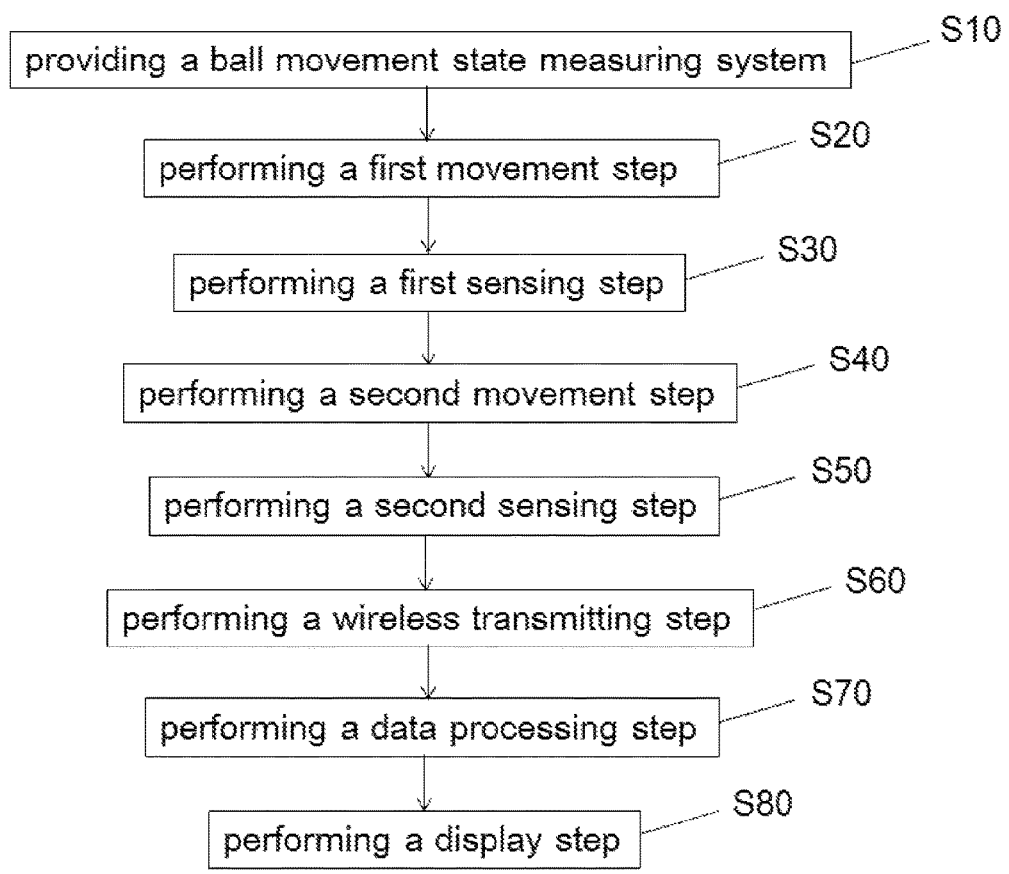
FIG. 9 is a schematic flow diagram of the first preferred embodiment of the method of measuring ball movement state of the present invention.

Referring to FIG. 9, FIG. 9 is a schematic flow diagram of the first preferred embodiment of the method of measuring ball movement state of the present invention. As shown in FIG. 9, in the first preferred embodiment, the method of measuring ball movement state of the present invention at least comprises steps S10 to S80. In step S10, a ball movement state measuring system is provided, and the ball movement state measuring system comprises the ball, the sensing module, the wireless communication module, the power supply and the induction coil, wherein the sensing module comprises the acceleration sensor and the angular velocity sensor. In step S20, a first movement step is performed to force the ball in the first movement state by gravity, applied force and air resistance. In step S30, a first sensing step is performed to detect the first acceleration and the first angular velocity of the ball at the first movement state by the acceleration sensor and the angular velocity sensor of the sensing module. In step S40, a second movement step is performed to force the ball in the second movement state by gravity, air resistance and centripetal force. In step S50, a second sensing step is performed to detect the second acceleration and the second angular velocity of the ball at the second movement state by the acceleration sensor and the angular velocity sensor of the sensing module. In step S60, a wireless transmitting step is performed to wirelessly transmit the first acceleration and the first angular velocity of the ball at the first movement state and the second acceleration of the ball at the second movement state respectively to the electronic device by the wireless communication module, wherein the electronic device preferably acquires the environment parameter the ball located. In step S70, a data processing step is performed to calculate the speed, the rotation speed, the rotation axis and the trace of the ball at the first movement state based on the first acceleration and the first angular velocity of the ball at the first movement state to obtain the first movement result, and to calculate the speed, the rotation speed, the rotation axis and the trace of the ball at the second movement state based on the speed and the rotation axis of the ball at the first movement state, the second acceleration and the environment parameter of the ball at the second movement state to obtain the second movement result by the processor of the electronic device. Detailed speaking, the first speed of the ball at the first movement state is calculated based on a first acceleration of the acceleration of the ball at the first movement state, the rotation speed of the ball at the first movement state is calculated based on a first angular velocity of the angular velocity of the ball at the first movement state, the rotation axis of the ball at the first movement state is calculated based on the first angular velocity of the ball at the first movement, and the trace of the ball at the first movement state iscalculated based on the first acceleration of the ball at the first movement state. Wherein the first angular velocity of the ball is degrees the ball rotating per second at the first movement state, and the rotation speed of the ball at the first movement state is revolutions the ball rotating per minute at the first movement state such that the rotation speed of the ball at the first movement state is equal to $30/\pi$ times of the first angular velocity of the ball. And, the second speed of the ball at the second movement state is calculated based on a second acceleration of the acceleration of the ball at the second movement state, the rotation speed of the ball at the second movement state is calculated based on the second acceleration of the ball at the second movement state, the rotation axis of the ball at the second movement state is calculated based on the first speed of the ball at the first movement state and the second acceleration of the ball at the second movement state, and the trace of the ball at the second movement state is calculated based on the rotation axis of the ball at the first movement state, the second acceleration of the ball and the environment parameter at the second movement state, wherein the rotation speed of the ball at the second movement state is revolutions the ball rotating per minute at the second movement state. In step S80, a display step is performed to display the first movement result and the second movement result by the electronic device. The aforementioned environment parameter can, for example, comprises one or more of a temperature value, an elevation value, a wind force, a wind direction and a humidity value. And, the sensing module can further comprises the temperature sensor, and the temperature value of the environment parameter can be detected by the temperature sensor or provided by the Bureau of Meteorology via the program installed on the electronic device or by the database stored in the electronic device.

Figure 10:
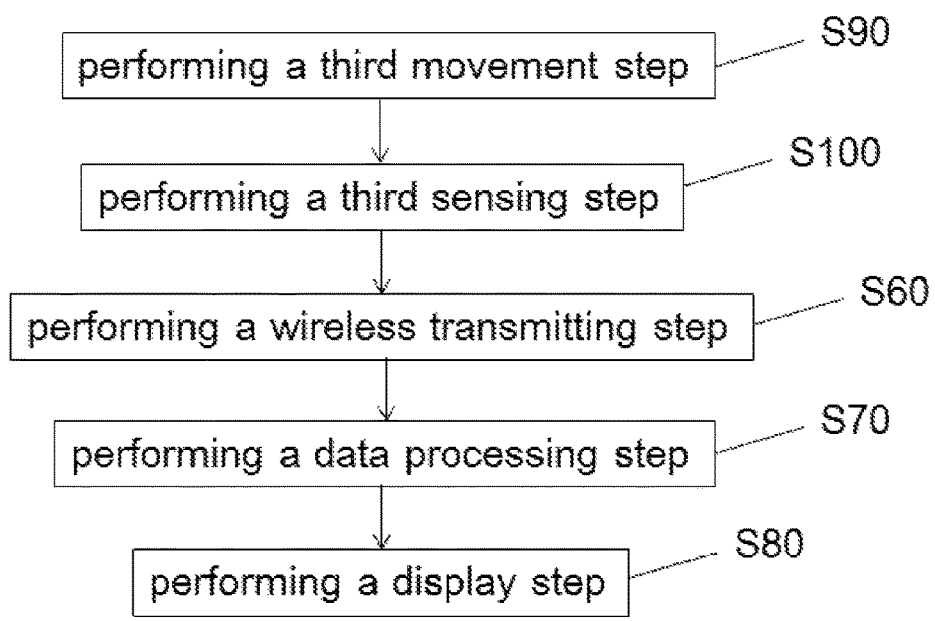
FIG. 10 is a schematic flow diagram of the second preferred embodiment of the method of measuring ball movement state of the present invention.
Figure 11:
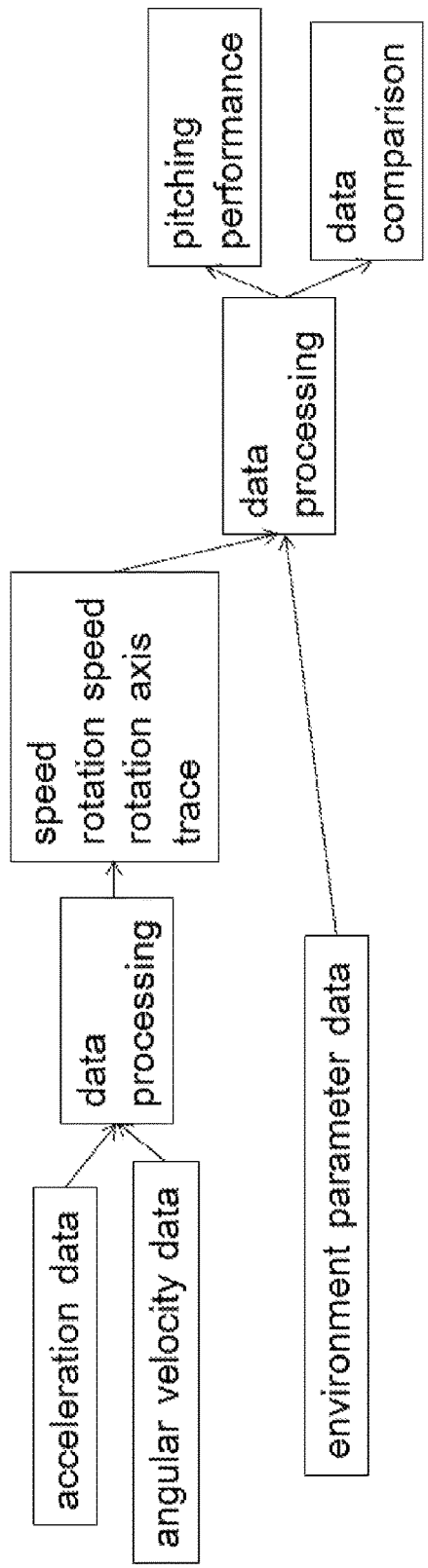
FIG. 11 is a schematic diagram of processing data and displaying the movement result of the present invention.

In the second preferred embodiment, the method of measuring ball movement state of the present invention comprises not only steps S10 to S80, but also steps S90 and S100. The difference between the second preferred embodiment and the first preferred embodiment method of measuring ball movement state of the present invention is merely that the second preferred embodiment further comprises steps S90 and S100, and therefore steps S10 to S80 will not be more detailed described. As shown in FIG. 10, FIG. 10 is a schematic flow diagram of the second preferred embodiment of the method of measuring ball movement state of the present invention. In steps S90, a third movement step is performed to force the ball in the third movement state by gravity, applied force and air resistance. In step S100, a third sensing step is performed to detect the third acceleration and the third angular velocity of the ball at the third movement state by the acceleration sensor and the angular velocity sensor of the sensing module. Then a wireless transmitting step is performed (step S60) to wirelessly transmit the third acceleration and the third angular velocity of the ball at the third movement state to the electronic device by the wireless communication module. Next, a data processing step is performed (step S70) to calculate the speed, the rotation speed, the rotation axis and the trace of the ball at the third movement state based on the third acceleration and the third angular velocity of the ball at the third movement state to obtain the third movement result. Finally, a display step is performed (step S80) to display the third movement result by the electronic device.

The measurement of ball movement state by the ball movement state measuring system of the present invention will be described below. Referring to FIGS. 1, 2, 4, 7 and 9, first the ball movement state measuring system is provided (step S10), and user or pitcher can hold the ball 10 and then perform the first movement step (step S20) to force the ball 10 in the first movement state X by gravity, applied force and air resistance (referring to FIG. 7). During the period of the first movement state X, the acceleration sensor 22 and the angular velocity sensor 24 of the sensing module 20 will detect the acceleration (i.e. the first acceleration) and the angular velocity (i.e. the first angular velocity) of the ball 10 at the first movement state X (step S30), and the first acceleration and the first angular velocity of the ball 10 at the first movement state X will be wirelessly transmitted to the electronic device 70 by the wireless communication module 30 (step S60). The first acceleration and the first angular velocity of the ball 10 at the first movement state X can be wirelessly transmitted to the electronic device 70 per 40 ms by the wireless communication module 30, but not limited thereto. Afterwards, the speed, the rotation speed, the rotation axis and the trace of the ball 10 at the first movement state X is calculated based on the first acceleration and the first angular velocity of the ball 10 at the first movement state X to obtain the first movement result by the processor 72 of the electronic device 70 (step S70). Finally, the first movement result is displayed by the electronic device 70 (step S80) (referring to FIG. 11). The aforementioned first movement result can, for example, comprises the user information such as name or code representing the user, the ball movement time, the speed, the rotation speed, the rotation axis and the trace of the ball and/or the environment parameter.

After the ball 10 is throwing out by the pitcher (i.e. referring to FIG. 7, the ball 10 is at the second movement state Y), the ball 10 is forced by gravity, air resistance and centripetal force (step S40). During the period of the second movement state Y, the acceleration sensor 22 and the angular velocity sensor 24 of the sensing module 20 will detect the acceleration (i.e. the second acceleration) and the angular velocity (i.e. the second angular velocity) of the ball 10 at the second movement state Y (step S50), and the second acceleration and the second angular velocity of the ball 10 at the second movement state Y will be wirelessly transmitted to the electronic device 70 by the wireless communication module 30 (step S60). Similarly, the second acceleration and the second angular velocity of the ball 10 at the second movement state Y can be wirelessly transmitted to the electronic device 70 per 40 ms by the wireless communication module 30, but not limited thereto. Afterwards, the speed, the rotation speed, the rotation axis and the trace of the ball 10 at the second movement state Y is calculated based on the speed and the rotation axis of the ball 10 at the first movement state X, the second acceleration and the environment parameter obtained by the electronic device 70 (the temperature value of the environment parameter can be provided by the program of the electronic device 70 or by the temperature sensor 26 of the ball 10) to obtain the second movement result by the processor 72 of the electronic device 70 (step S70). Finally, the second movement result is displayed by the electronic device 70 (step S80) (referring to FIG. 11). The aforementioned second movement result can, for example, comprises the user information such as name or code representing the user, the ball movement time, the speed, the rotation speed, the rotation axis and the trace of the ball and/or the environment parameter.

Figure 8:
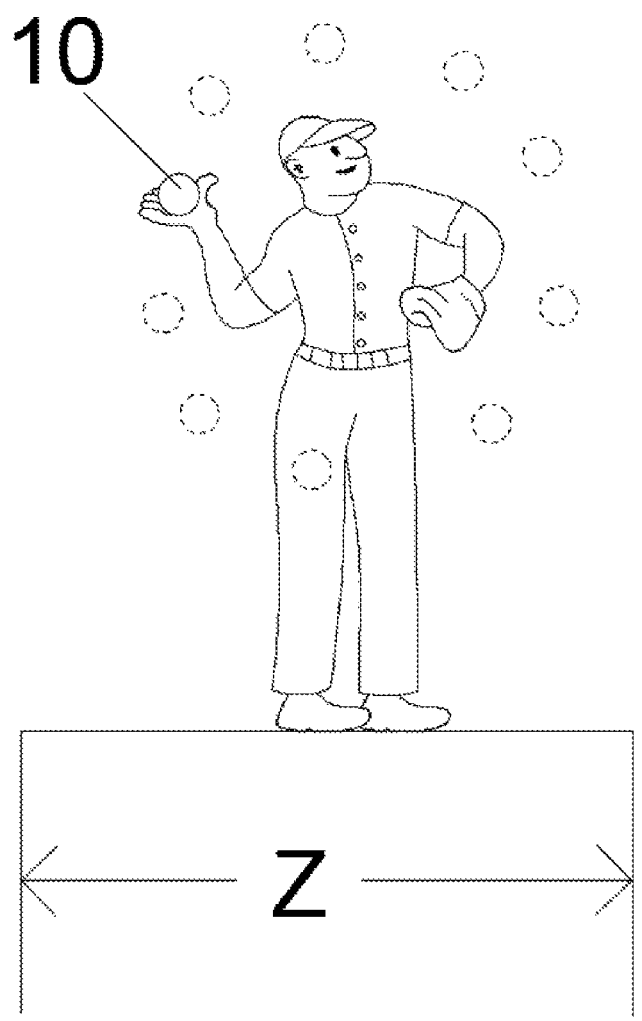
FIG. 8 is a schematic diagram of the ball at the third movement state.

Referring to FIGS. 1, 2, 4, 8 and 10, when user moves the ball 10 by forcing the ball 10, but not throwing out the ball 10 (such as holding the ball 10 and circling or displacing the ball 10, etc., referring to FIG. 8), the ball 10 is forced by gravity, applied force and air resistance in the third movement state Z (Step S90). During the period of the third movement state Z, the acceleration sensor 22 and the angular velocity sensor 24 of the sensing module 20 will detect the acceleration (i.e. the third acceleration) and the angular velocity (i.e. the third angular velocity) of the ball 10 at the third movement state Z (step S100), and the third acceleration and the third angular velocity of the ball 10 at the third movement state Z will be wirelessly transmitted to the electronic device 70 by the wireless communication module 30 (step S60). Similarly, the third acceleration and the third angular velocity of the ball 10 at the third movement state Z can be wirelessly transmitted to the electronic device 70 per 40 ms by the wireless communication module 30, but not limited thereto. Afterwards, the speed, the rotation speed, the rotation axis and the trace of the ball 10 at the third movement state Z is calculated based on the third acceleration and the third angular velocity of the ball 10 at the third movement state Z to obtain the third movement result by the processor 72 of the electronic device 70 (step S70). Finally, the third movement result is displayed by the electronic device 70 (step S80) (referring to FIG. 11). The aforementioned third movement result can, for example, comprises the user information such as name or code representing the user, the ball movement time, the speed, the rotation speed, the rotation axis and the trace of the ball and/or the environment parameter. The accuracy of measurement of the ball movement state measuring system 100 can be estimated by performing the third movement step S90 to change the location of the ball 10. Additionally, in an embodiment, the ball 10 further comprises a processor. When the ball 10 moves, the processor will analyze whether the movement of the ball 10 comply with a preset mode. If yes, the wake-up action is performed, i.e. to transmit the acceleration and the angular velocity of the ball 10 to the electronic device 70 by the wireless communication module 30 and display the movement result by the electronic device 70.

In the method of measuring ball movement state of the present invention, the first movement result, the second movement result and/or the third movement result obtained by the data processing process S70 can be displayed by the electronic device 70. For example, the first movement result, the second movement result and/or the third movement result can be displayed by a display screen of the electronic device 70 or voice broadcasted by the player such as a loudspeaker of the electronic device 70 or presented by vibrating a vibrator of the electronic device 70. And, the pitching performance can be estimated based on the first movement result, the second movement result or the third movement result and the physiological data of user such as height, weight or age by the processor 72. In one embodiment, the first movement result, the second movement result and/or the third movement result can be displayed by the display screen of the electronic device 70, and the user can know the pitching performance, such as the trace, of each pitching by viewing the display screen. And, after pitching repeatedly, all or portion of the plurality of pitching performances can be displayed on the display screen together by the processor 72. Therefore, user can compare the pitching performances by viewing the display screen. Accordingly, the user can know whether his/her pitching technique is getting better base on the displayed result of pitching performance and comparative data to achieve the purpose of training.

In summary, in the ball movement state measuring system and the method thereof of the present invention, the acceleration and the angular velocity of the ball can be detected by the acceleration sensor and the angular velocity sensor of the sensing module and transmitted to the processor of the electronic device, and the speed, rotation speed, rotation axis and trace of the ball can be calculated by the processor. And, the speed, rotation speed, rotation axis and trace of the ball at the first movement state can be calculated based on the first acceleration and the first angular velocity of the ball at the first movement state by the processor, and the first movement result of the ball can also be obtained; and the speed, rotation speed, rotation axis and trace of the ball at the second movement state can be calculated based on the speed and the rotation axis of the ball at the first movement state, the second acceleration and the environment parameter of the ball at the second movement state by the processor, and the second movement result of the ball can also be obtained. Additionally, the power supply can be charged by electromagnetic induction occurred by the wireless charging plate and the induction coil of the ball. And, the structural error can be eliminated and the cushioning effect can be provided for the sensing module, the wireless communication module and the power supply disposed inside the accommodation element by the cushion structure covering the outside of the accommodation element such that the damage of the sensing module, the wireless communication module and the power supply during the ball movement process can be prevented.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A ball movement state measuring system, comprising:
a ball having an accommodation element and a cover covering the accommodation element, wherein an overall centroid of the ball movement state measuring system is adjusted to comply with a geometric center of the ball;
a sensing module comprising an acceleration sensor and an angular velocity sensor, the acceleration sensor being used for detecting an acceleration of the ball, the angular velocity sensor being used for detecting an angular velocity of the ball;
a wireless communication module electrically connected to the sensing module and wirelessly transmitting the acceleration and the angular velocity of the ball to an electronic device, wherein the electronic device has a processor and acquires an environment parameter where the ball is located;
a power supply electrically connected to the sensing module and the wireless communication module, and the sensing module, the wireless communication module and the power supply are disposed inside the accommodation element; and an induction coil disposed between the cover and the accommodation element and electrically connected to the power supply, wherein the electronic device wirelessly receives the acceleration and the angular velocity of the ball, and a first movement result is obtained by the processor, wherein the first movement result comprises a user information, a ball movement time, a first speed, a rotation speed, a rotation axis and a trace of the ball and the environment parameter at a first movement state, wherein the first speed of the ball at the first movement state is calculated based on a first acceleration of the acceleration of the ball at the first movement state, the rotation speed of the ball at the first movement state is calculated based on a first angular velocity of the angular velocity of the ball at the first movement state, the rotation axis of the ball at the first movement state is calculated based on the first angular velocity of the ball at the first movement state, and the trace of the ball at the first movement state is calculated based on the first acceleration of the ball at the first movement state, wherein the first angular velocity of the ball is degrees the ball rotating per second at the first movement state, and the rotation speed of the ball at the first movement state is revolutions the ball rotating per minute at the first movement state such that the rotation speed of the ball at the first movement state is equal to $30/\pi$ times of the first angular velocity of the ball, wherein a second movement result is obtained by the processor, wherein the second movement result comprises the user information, a ball movement time, a second speed, a rotation speed, a rotation axis and a trace of the ball and the environment parameter at a second movement state, wherein the second speed of the ball at the second movement state is calculated based on a second acceleration of the acceleration of the ball at the second movement state, the rotation speed of the ball at the second movement state is calculated based on the second acceleration of the ball at the second movement state, the rotation axis of the ball at the second movement state is calculated based on the first speed of the ball at the first movement state and the second acceleration of the ball at the second movement state, and the trace of the ball at the second movement state is calculated based on the rotation axis of the ball at the first movement state, the second acceleration of the ball and the environment parameter at the second movement state, wherein the rotation speed of the ball at the second movement state is revolutions the ball rotating per minute at the second movement state, wherein the ball is forced by gravity, applied force and air resistance at the first movement state, and the ball is forced by gravity, air resistance and centripetal force at the second movement state.

2. The system of claim 1, further comprising a cushion structure covering an outside of the accommodation element.

3. The system of claim 2, wherein the cushion structure is conformally covering the outside of the accommodation element.

4. The system of claim 1, further comprising a relay electrically connected to the induction coil and the power supply to be an automatic charging switch of the power supply.

5. The system of claim 4, further comprising a wireless charging base, and the ball is put on a concave surface of the wireless charging base such that the induction coil is distant from a wireless charging plate of the wireless charging base by a predetermined charging distance to produce power to charge the power supply.

6. The system of claim 5, wherein the predetermined charging distance is less than 10 mm.

7. The system of claim 6, wherein the predetermined charging distance is less than 6 mm.

8. The system of claim 1, wherein the overall centroid of the ball movement state measuring system is adjusted to comply with the geometric center of the ball by adjusting positions of the sensing module, the wireless communication module, the power supply and the induction coil or additionally disposing a weight member inside the accommodation element.

9. The system of claim 1, wherein the environment parameter comprises one or more of a temperature value, an elevation value, a wind force, a wind direction and a humidity value.

10. The system of claim 9, wherein the sensing module further comprises a temperature sensor, and the temperature value of the environment parameter is detected by the temperature sensor.

11. The system of claim 9, wherein the environment parameter is provided by a program installed on the electronic device or a database stored in the electronic device.

12. A method of measuring ball movement state, comprising:
providing a ball movement state measuring system as recited in claim 1;
performing a first movement step to force the ball in a first movement state by gravity, applied force and air resistance;
performing a first sensing step to detect a first acceleration and a first angular velocity of the ball at the first movement state by the acceleration sensor and the angular velocity sensor of the sensing module;
performing a second movement step to force the ball in a second movement state by gravity, air resistance and centripetal force;
performing a second sensing step to detect a second acceleration and a second angular velocity of the ball at the second movement state by the acceleration sensor and the angular velocity sensor of the sensing module;
performing a wireless transmitting step to wirelessly transmit the first acceleration and the first angular velocity of the ball at the first movement state and the second acceleration of the ball at the second movement state respectively to an electronic device by the wireless communication module, wherein the electronic device acquires an environment parameter where the ball is located; and
performing a display step to display the first movement result and the second movement result by the electronic device.

13. The method of claim 12, further comprising performing a third movement step to force the ball in a third movement state by gravity, applied force and air resistance and performing a third sensing step to detect a third acceleration and a third angular velocity of the ball at the third movement state by the acceleration sensor and the angular velocity sensor of the sensing module.

14. The method of claim 12, wherein the environment parameter comprises one or more of a temperature value, an elevation value, a wind force, a wind direction and a humidity value.

15. The method of claim 14, wherein the sensing module further comprises a temperature sensor, and the temperature value of the environment parameter is detected by the temperature sensor.

16. The method of claim 14, wherein the environment parameter is provided by a program installed on the electronic device or a database stored in the electronic device.

17. The method of claim 12, wherein the first movement result and the second movement result are displayed by a display screen, a loudspeaker or a vibrator of the electronic device.

\* \* \* \* \*